(12) United States Patent
Nielsen et al.

(10) Patent No.: US 8,480,367 B2
(45) Date of Patent: Jul. 9, 2013

(54) YAWING SYSTEM FOR A WIND TURBINE

(75) Inventors: Thomas Krag Nielsen, Hinnerup (DK); Etekamba Okon Willie, Tilst (DK)

(73) Assignee: Vestas Wind Systems A/S, Aarhus N (DK)

( * ) Notice: Subject to any disclaimer, the term of this patent is extended or adjusted under 35 U.S.C. 154(b) by 862 days.

(21) Appl. No.: 12/447,051

(22) PCT Filed: Oct. 31, 2007

(86) PCT No.: PCT/EP2007/061761
§ 371 (c)(1),
(2), (4) Date: Dec. 11, 2009

(87) PCT Pub. No.: WO2008/053017
PCT Pub. Date: May 8, 2008

(65) Prior Publication Data
US 2010/0109327 A1 May 6, 2010

(30) Foreign Application Priority Data
Nov. 3, 2006 (DK) .................................. 2006 01441

(51) Int. Cl.
*B63H 3/10* (2006.01)
(52) U.S. Cl.
USPC ........................................ 416/170 R; 416/246
(58) Field of Classification Search
USPC 416/147, 148, 149, 170 R, 171, 246; 290/44, 290/55
See application file for complete search history.

(56) References Cited

U.S. PATENT DOCUMENTS

| | | | |
|---|---|---|---|
| 4,966,525 A * | 10/1990 | Nielsen | 416/9 |
| 5,035,575 A | 7/1991 | Nielsen et al. | |
| 6,879,055 B2 | 4/2005 | Becker et al. | |
| 2005/0196280 A1 * | 9/2005 | Gonzalez et al. | 416/131 |

FOREIGN PATENT DOCUMENTS

| | | |
|---|---|---|
| DE | 19629168 | 10/1997 |
| EP | 0945613 | 9/1999 |
| EP | 1571334 | 9/2005 |
| JP | 8082277 | 3/1996 |
| WO | WO 97/03288 | 1/1997 |
| WO | WO97/22804 | 6/1997 |
| WO | WO/00/31413 | 6/2000 |
| WO | WO 01/86141 | 11/2001 |

OTHER PUBLICATIONS

Gasch R ED "Windkraftanlagen. Grundlagen and Entwurf", Stuttgart, Jan. 1, 1999, p. 70-71, 72, 88-89 and 90-91, XP-002130509.

* cited by examiner

*Primary Examiner* — Edward Look
*Assistant Examiner* — Maxime Adjagbe
(74) *Attorney, Agent, or Firm* — Wood, Herron & Evans, LLP

(57) ABSTRACT

A yawing system for a wind turbine with a tower construction and a nacelle includes a stationary part associated with the tower construction, and a rotating part being associated with the nacelle. The rotating part is allowed to rotate relative to the stationary part via a gear connection. The rotating part includes a plurality of modules, each having a sub-module, the sub-modules substantially identical in size and shape. Each module is configurable to perform various functions by positioning one or more function defining elements in the corresponding sub-module. Thereby a configured module belongs to a category of modules reflecting the function of the configured module. A module belonging to a category may be replaced or reconfigured to belong to a different category of modules without altering the main design of the rotating part.

16 Claims, 9 Drawing Sheets

YAWING SYSTEM FOR A WIND TURBINE

PRIORITY CLAIM

This is a U.S. national stage of application No. PCT/EP2007/061761, filed on Oct. 31, 2007. Priority is claimed on the following application(s): Country: Denmark, Application No.: PA 2006 01441, Filed: Nov. 3, 2006, the content of which is incorporated here by reference.

FIELD OF THE INVENTION

The present invention relates to a yawing system for use in a wind turbine. More particularly, the present invention relates to a yawing system which is highly customizable to meet specific local conditions, e.g. in terms of wind regime, braking requirements, damping requirements, etc. Furthermore, even though the yawing system of the present invention is highly customizable, it is still suitable for mass production, and thereby easy and cost effective to manufacture.

BACKGROUND OF THE INVENTION

A yawing system for a wind turbine is used for controlling the position of the rotor of the wind turbine relatively to the direction of the wind. Thus, a yawing system is used for rotating a nacelle relative to a tower about a substantially vertical axis. This rotation is normally effectuated by means of one or more yaw drives. Normally, a yaw drive comprises a yaw motor and a yaw gear.

In most prior art yawing systems the motors of the yaw drives, normally designated yaw motors, are positioned in such a manner that the yaw motor protrudes from the yawing system into the nacelle. They may, for example, be mounted directly on a base plate of the nacelle. A nacelle normally contains a number of other relatively space consuming components, such as a drive train of the wind turbine, for example, including a gear and a generator, or a gearless drive train, and the space available in the nacelle for other purposes is therefore limited. As a consequence of this, yaw drives for driving the yawing system have traditionally been arranged at positions in the nacelle where other parts permit. Thus, the yaw motors have typically been positioned 'around' these other parts, i.e., the positions of the yaw motors, and thereby the corresponding yaw drives, have been selected from an 'available space' point of view, rather than with due consideration to which positions would be optimal from an operational point of view. Apart from preventing operationally optimal positioning of the yaw drives, this approach limits the freedom to design the yawing system, for example, in terms of number and positions of the drive units, as well as number and positions of other necessary parts of the yawing system, such as brake modules, various damping means, etc. This is a great disadvantage.

EP 1 571 334 discloses a wind turbine yawing system comprising a gear ring fixed to a tower and at least one geared motor fixed to a frame, meshed to the gear ring through a gear wheel. The geared motor protrudes into the nacelle as described above. The yawing system of EP 1 571 334 further comprises at least one active braking module and at least one passive braking module. The active and passive braking modules can comprise a body of equal dimensions and equal fixing means for fixing them to the frame, and one type of module can be replaced by the other. With this possibility, it is possible to vary the ratio between the number of active braking modules and the number of passive braking modules to have a braking effect adjusted to the circumstances of the wind of the place where the wind turbine is installed. Accordingly, the yawing system disclosed in EP 1 571 334 is customizable to some extent. However, the problems described above relating to the positioning of the yaw drives are not solved by this yawing system. Furthermore, it is not possible to customize the yawing force applied by the yawing motors.

SUMMARY OF THE INVENTION

It is, thus, an object of the invention to provide a yawing system for a wind turbine, the yawing system being more customizable than prior art yawing systems.

It is a further object of the invention to provide a yawing system for a wind turbine, the yawing system being easy and cost effective to manufacture.

It is an even further object of the invention to provide a yawing system for a wind turbine, in which yawing system a yawing force applied by yawing motor(s) is customizable.

According to the present invention, the above and other objects are fulfilled by providing a yawing system for a wind turbine comprising a tower construction and a nacelle, the yawing system comprising:
  a stationary part being connectable to or forming part of a tower construction of a wind turbine,
  a rotating part being connectable to a nacelle of a wind turbine, the rotating part being arranged adjacent to the stationary part in such a manner that the rotating part is allowed to rotate relative to the stationary part via a gear connection between the stationary part and the rotating part, wherein the rotating part comprises a plurality of modules, each comprising a sub-module, the sub-modules being at least substantially identical in size and shape, each module being configurable to perform various functions, a configured module belonging to a category of modules reflecting the function of the configured module, at least one of said modules being configured as a drive module adapted to drive a rotational movement of the rotational part relatively to the stationary part, via the gear connection, and wherein a module belonging to a category may be replaced or reconfigured to belong to a different category of modules without altering the main design of the rotating part.

The yawing system is adapted to be positioned in a wind turbine, and it will normally be positioned between a tower construction and a nacelle. The tower construction is a structural and load carrying part of the wind turbine adapted to be connected to the ground and to carry various parts of the wind turbine, including its own weight, the nacelle, any parts positioned in the nacelle, such as power generating means, including a drive train, a generator, etc., a set of turbine blades, etc. The nacelle is a part of the wind turbine which is carried by the tower, carries a set of turbine blades, and contains power generating means, including a drive train.

The stationary part of the yawing system is connectable to or forms part of the tower construction. Thus, the stationary part may either form an integral part of the tower construction, or it may be connected thereto, for example, by means of a tower flange and/or by means of bolts or other suitable connecting means. In this case, the stationary part preferably comprises means for connecting the stationary part to a tower construction. In any event, when the yawing system is positioned in a wind turbine, the stationary part is not movable relative to the tower construction. Since the tower construction is fixed relative to the ground, the stationary part will therefore not be movable relative to the ground, hence the term 'stationary part'.

The rotating part of the yawing system is connectable to a nacelle, for example, by means of a flange and/or by means of bolts or other suitable connecting means. Accordingly, the rotating part preferably comprises means for connecting the rotating part to a nacelle. Thus, when the yawing system is positioned in a wind turbine, the rotating part is fixed relatively to the nacelle, even though the rotating part does not form an integral part of the nacelle, but rather forms an independent part of the wind turbine.

The rotating part is allowed to rotate relative to the stationary part. Thus, when the yawing system is positioned in a wind turbine, the nacelle, which is fixed relative to the rotating part, is allowed, via the yawing system, to rotate relative to the tower construction, which is fixed relatively to the stationary part. The rotation takes place via a bearing.

The rotating part comprises a plurality of modules. Each module comprises a sub-module, and the sub-modules are at least substantially identical in size and shape. The size and shape of a sub-module should have sufficient impact on the size and shape of the corresponding module to allow one module to be replaced by another module without altering the main design of the rotating part. However, slight variations in size and shape, as well as variations in size and shape which does not affect the main design of the rotating part, for example, the interface between the rotating part and the stationary part or the interface between the rotating part and the nacelle, are acceptable. The sub-modules may be made from a single piece, or they may be assembled from a number of separate parts.

The sub-modules may be regarded as basis parts of the modules which can be used for modules belonging to different categories, and the modules may be distinguishable by additional configuring elements positioned or mounted in the sub-modules. This will be explained further below.

Each module is configurable to perform various functions, for example, driving the relative rotational movement between the stationary part and the rotating part, braking the yawing system, damping torsional movements of the nacelle, etc. Thus, the modules can each be configured to be able to perform one of a plurality of functions, and the configuration determines which function a given module is able to perform. Once a module has been configured to perform a specific function, the module belongs to a category of modules, the category reflecting the function which the module has been configured to perform. The configuration may be permanent, in which case it will not be possible to reconfigure a module once it has been configured. In this case the configuration preferably takes place at a manufacturing site. However, various modules belonging to different categories may still be manufactured using a limited number of standard components. For instance, the sub-modules used for the various modules may advantageously be identical. Alternatively, and preferably, the configuration may be reversible. In this case a configured module can be reconfigured, i.e., it may be altered in such a manner that it will be able to perform a different function. This may even be done while the yawing system is positioned in a wind turbine. In this case it is possible to adjust the yawing system, for example, in terms of maximum yaw braking moment, total force applied by the drive modules, etc., without dismantling, and maybe even replacing, the entire yawing system. This is a great advantage.

Thus, a module belonging to a category may be replaced or reconfigured to belong to a different category of modules, i.e., the function performed by a specific module can be changed. This can be done without altering the main design of the rotating part, and possibly even without removing the module from the yawing system. Thereby the rotating part may be designed to meet specific conditions or requirements, such as an expected local wind regime at the site where it is intended to position a wind turbine comprising the yawing system, the size of a wind turbine comprising the yawing system, expected required maximum yaw braking moment, etc. Accordingly, the yawing system can be customized to a specific application at a specific site merely by selecting appropriate numbers of modules belonging to various categories, and by positioning the selected modules relative to each other in an appropriate manner. Accordingly, the yawing system of the present invention is highly customizable, and this is very advantageous. Furthermore, since the modules are standard modules, this is obtained without the requirement of specially designing parts for the yawing system, and the yawing system is thereby suitable for mass production, and the manufacturing is therefore easy and cost effective. This is also an advantage.

Since at least one of the modules is configured as a drive module, the total force applied by drive module(s) is one of the parameters which may be easily customized as described above. Furthermore, the drive modules are not mounted directly in a base plate of the nacelle, but rather form part of the rotating part of the yawing system being connectable to a nacelle, and the problems described above relating to position of the yaw drives inside the nacelle can thereby be avoided. Furthermore, the more different modules there is available, the more customizable the yawing system is.

Furthermore, it is possible to assemble the yawing system prior to positioning it in a wind turbine. This may, for example, take place at a construction site or at a test site, and it provides the possibility of testing the yawing system before positioning it in a wind turbine. This is an advantage because defects in the yawing system may be detected and corrected already at this point. This is much easier and more cost effective than it would be to detect and correct such defects once the yawing system has been installed in a wind turbine.

Finally, it is possible to adjust the yawing system, for example, with respect to maximum yaw braking moment or total force applied by the drive modules as described above, even after it has been installed in a wind turbine, since this may be done merely by replacing or reconfiguring one or more modules. Thus, it may be done without dismantling the entire yawing system. This is a great advantage.

Each configured module may belong to one of at least two different categories of modules. As mentioned above, the number of different categories determines how customizable the yawing system is, and it is therefore an advantage to have many different categories.

The stationary part and the rotating part may in combination form a separate yawing unit, said yawing unit being adapted to define an interface between a tower construction and a nacelle of a wind turbine having the yawing system positioned therein. This is advantageous because it allows the yawing unit to be manufactured and transported separate from the remaining parts of the wind turbine, in particular separate from the nacelle, and smaller parts are thereby transported. This facilitates transport of the wind turbine from a manufacturing site to an operating site. Furthermore, this design provides a clean mechanical interface between a base frame of the nacelle and the yawing system, and a much simpler base frame design is possible. Furthermore, this design allows the yawing system to be designed and optimized independently of base frame design. Finally, the described design allows the yawing system to be tested separate from the nacelle, for example, prior to mounting it on the nacelle.

Each drive module may comprise a drive motor, and the rotating part may define a connection plane where the rotating part is adapted to be connected to a nacelle of a wind turbine, and the drive motor(s) may be arranged in such a manner that the sub-modules are positioned between the drive motor(s) and the connection plane. The drive motors are often designated yaw motors. According to this embodiment, when the yawing system is positioned in a wind turbine, between the tower construction and the nacelle, the drive motor(s) is/are positioned on the 'tower construction side' of the yawing system. Accordingly, the drive motor(s) do(es) not protrude into the interior of the nacelle, and positioning of the drive modules therefore does not need to take available space in the nacelle into account. Thereby the yawing system can be designed and dimensioned independently of the design of the nacelle.

According to one embodiment, the yawing system may comprise a fixing plate onto which the modules may be fixed. Such a fixing plate may, for example, be used during transport or test of the yawing system in order to maintain the modules at fixed relative positions. This may in particular be an advantage in the case that the rotating part comprises relatively few modules arranged with a relatively large spacing. It may also be an advantage to fix the modules to such a fixing plate during mounting of the yawing system in a wind turbine. This may facilitate correct mounting of the modules to the nacelle.

The drive motor may be a geared motor. Alternatively, the motor may be of a kind having a direct drive, for example, of a kind where the motor drives a pinion gear meshing with a gear wheel or a gear ring positioned at the stationary part, without a gearing between the rotation of the motor and the pinion gear.

The drive motor may be electrically driven, or it may be hydraulically driven.

The categories of modules may be selected from the group consisting of: drive modules, active braking modules, passive braking modules, damping modules, structural modules and covering modules. Alternatively or additionally, other kinds of modules may be used in the yawing system, depending on required functions of the modules.

As explained above, drive modules are used for driving the yawing system, i.e., they are used for causing a rotation of the rotating part relative to the stationary part, via the gear connection between the stationary part and the rotating part. For each drive module, this may advantageously be obtained by driving a pinion gear positioned on the drive module, the pinion gear meshing with a gear part positioned on the stationary part. The gear part on the stationary part may advantageously be in the form of a gear ring, for example, a toothed gear ring. As described above, the drive modules may advantageously be driven by means of a yaw motor, for example, an electrical motor, a hydraulic motor, or any other suitable kind of motor, geared or non-geared.

Braking modules are modules which have the function of braking the yawing system with respect to a relative rotational movement between the rotating part and the stationary part. The braking modules may be active or passive.

The active braking modules are modules in which a braking force may be selectively applied. The braking force may, in this case, be provided using a movable braking member arranged on the active braking module into or out of engagement with a part positioned on the stationary part, for example, a friction track, or by changing a friction force between such two members. The movable braking member may, for example, be moved by means of a piston being electrically, electromagnetically or hydraulically driven. Alternatively, an active braking module may operate by means of a gear mechanism, by means of a worm gear. As an alternative, an active braking module may comprise a braking motor adapted to cause a rotational movement of the yawing system in an opposite direction as compared to the direction of rotation caused by the drive modules. An advantage of using such a braking motor is that the braking torque exerted by the motor may be specifically selected for the purpose. As yet another alternative, an active braking module may form part of a drive module, e.g. in the form of electromagnetic brakes positioned in the yaw drive. The active braking modules are preferably controlled by means of a control system.

Passive braking modules are modules which provide an at least substantially constant braking force. This may, for example, be obtained by biasing a braking member positioned on a braking module against a braking member positioned on the stationary part. The biasing force determines the resulting braking force. The braking members may advantageously be or comprise friction plates. The biasing force may advantageously be provided by a spring member arranged on the braking module in such a manner that it pushes the braking member of the braking module towards the braking member of the stationary part. Alternatively, the biasing force may be provided in any other suitable manner.

Damping modules are modules which are adapted to provide damping, for example, torsional damping, to the wind turbine, in particular for damping torsional movements of the nacelle. The damping modules may comprise a hydraulic damping element, for example, in the form of a hydraulic pump. When the yawing system operates to rotate the rotating part relative to the stationary part, this rotational movement causes a rotation of a pinion arranged in the damping module. The rotation of the pinion causes the hydraulic pump to displace hydraulic fluid, thereby damping the yawing movement of the yawing system. In this case, the faster the yawing rotation, the faster the pinion will rotate. This will cause hydraulic fluid to be displaced at a higher rate, and thereby a larger damping effect.

As an alternative, the damping module may comprise an electrical motor.

Structural modules are modules which are adapted to provide structural stability to the yawing system construction, for example, by carrying structural loads. Thus, the structural modules should preferably be made from a material which is able to withstand structural loads, for example, steel.

Covering modules are modules having the sole purpose of filling out possible gaps between other modules or standing in for 'missing modules' in the rotating part. Accordingly, there are no requirements to the material used for the covering modules, for example, with respect to ability to carry structural loads, wear and tear, etc. Accordingly, a cost effective material, such as a plastic material, may be chosen for this purpose. Thus, the covering modules may be regarded as 'dummy modules'.

It may be envisaged that some covering modules comprise a sub-module as defined above, i.e., being at least substantially identical in size and shape to the sub-modules of other kinds of modules. In this case the covering module may simply be a sub-module. Alternatively or additionally, some of the covering modules may have a different size and/or shape, for example, in order to be able to fill in smaller gaps between the other modules. This will be explained further below.

The gear connection may comprise a toothed ring arranged on or forming part of the stationary part. In this case each drive module preferably comprises a pinion gear adapted to mesh with the toothed ring. Rotating the pinion gear(s) of the drive module(s) will thereby cause a relative rotational movement between the rotating part and the stationary part, due to the mesh.

The toothed ring may be internally toothed. In this case the pinion gear(s) is/are positioned at an inner perimeter of the toothed ring. This is an advantage because it allows the yaw drives to be positioned inside a tower construction of a wind turbine.

Alternatively or additionally, the toothed ring may be formed by at least two ring segments. According to this embodiment the yawing system may be transported while the ring segments are separated, i.e., smaller parts are transported. This facilitates the transport and makes it more cost effective.

The rotating part may further comprise at least one covering module, and the sub-modules and the covering module(s) in combination may form an at least substantially closed ring. It is an advantage that an at least substantially closed ring is formed, because this provides the possibility of providing lubricant in the closed ring, thereby providing lubrication to moving parts of the yawing system via a closed system. According to this embodiment, the covering modules preferably have a size and a shape which differs from the size and shape of the remaining modules, and the differences are most preferably of such a nature that it is possible to remove a module or a covering module from the closed ring of modules in a radial direction. Thereby it is possible to gain access to the lubrication system, and it is possible to replace a module or a covering module, for example, due to operational failure or wear of a module, or because it is desired to replace a module with a module belonging to a different category. This may be obtained without having to dismantle the entire yawing system.

The modules may be provided with sliding surfaces in order to allow the modules to slide relatively to the stationary part. In this case the stationary part is preferably provided with one or more sliding plates onto which the sliding surfaces of the modules slide. The sliding surfaces may advantageously be positioned on the sub-modules, in which case the sub-modules define the interface between the rotating part and the stationary part. The sliding surfaces may be made from or coated with a sliding material, for example, a synthetic material, such as a plastic material, or a metal.

Due to the modular design of the rotating part, it is very easy to replace sliding material in case of wear.

Each drive module may comprise a pinion gear adapted to mesh with a gear part of the stationary part, and the pinion gear of each drive module may be supported against radial deflections via two supporting points, said supporting points being arranged on the sub-module on opposing sides of the pinion gear along a direction defined by an axis of rotation for the pinion gear. Preferably, the supporting points are arranged on the sub-module on a 'stationary side' of the yawing system, and on a 'rotating side' of the yawing system, respectively, i.e., towards a tower construction and a nacelle, respectively, when the yawing system is positioned in a wind turbine. According to this embodiment, the pinion gear of each drive module is stabilized against radial deflections. Thereby it is obtained that an engagement between the pinion gear of the drive module and a corresponding gear part on the stationary part, for example, a toothed ring, is maintained at an optimum level.

At least some of the modules may be radially movable relatively to the stationary part. As mentioned above, this allows a module to be replaced without having to dismantle the entire yawing system. Furthermore, in the case that the modules comprise sliding tracks, this allows sliding material to be replaced without dismantling the yawing system.

According to one embodiment, at least one of the modules may be a braking module, at least one braking module comprising adjusting means for adjusting a braking force applied by said braking module, said adjusting means being operable while said braking module is positioned in the yawing system. The adjusting means may be in the form of a screw connected to a biasing means for biasing a braking member positioned at the braking module towards a braking member positioned at the stationary part. Furthermore, the adjusting means is operable while the braking module is positioned in the yawing system. Thereby the braking force applied by the braking module can be adjusted without dismantling the entire yawing system, and even without replacing a single module. This makes it very easy to adjust the yawing system according to local conditions, even after the yawing system has been installed in a wind turbine. The braking module may furthermore be provided with a spring positioned between a friction surface and the adjusting means, the spring pressing the friction surface against an opposing friction surface of the stationary part. Thereby it is obtained that the braking moment is automatically adjusted as the friction surfaces are subject to wear.

The modules may be configurable by positioning one or more function defining elements in the corresponding sub-module. According to this embodiment, the sub-modules may be regarded as 'basic modules' which are adapted to hold various function defining elements. Examples of function defining elements may include, but is not limited to, motor and pinion gear for drive modules, braking surface and biasing means for passive braking modules, braking surface and operating means, such as a piston, for active braking modules, damping means for damping modules, etc. Accordingly, when configuring a module, one would start out with a sub-module, and then apply the desired function defining element(s) to the sub-module, thereby obtaining a desired function of the module.

The yawing system may advantageously form part of a wind turbine, the wind turbine further comprising a tower construction and a nacelle. In this case the yawing system may preferably be arranged between the tower construction and the nacelle.

BRIEF DESCRIPTION OF THE DRAWINGS

The invention will now be described in further detail with reference to the accompanying drawings in which.

DETAILED DESCRIPTION OF THE DRAWINGS

Figure 1:
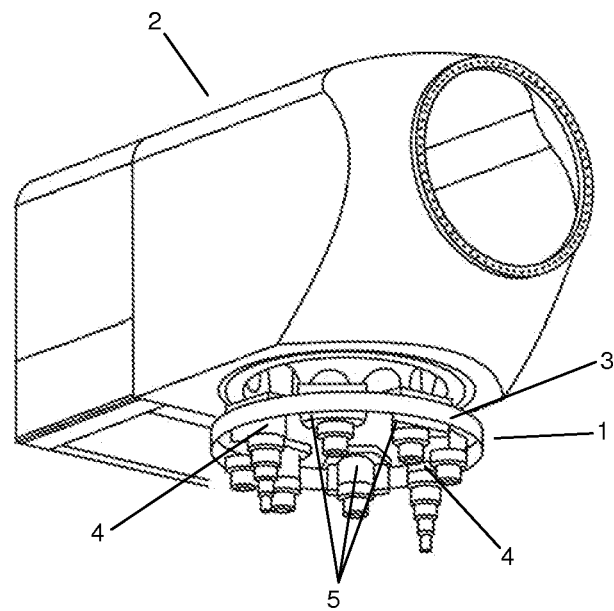
FIG. 1 is a perspective view of a yawing system according to an embodiment of the invention, positioned beneath and spaced apart from a nacelle of a wind turbine.

FIG. 1 is a perspective view of a yawing system 1 according to an embodiment of the invention. The yawing system 1 is shown positioned beneath and spaced apart from a nacelle 2 of a wind turbine, thereby illustrating where the yawing system 1 is supposed to be mounted relative to the nacelle 2.

The yawing system 1 comprises a toothed ring 3 adapted to be connected to a tower construction (not shown) of a wind turbine, and a number of modules 4, 5 adapted to be connected to the nacelle 2. The modules 4, 5 will be explained in further detail below with reference to FIG. 2.

Figure 2:
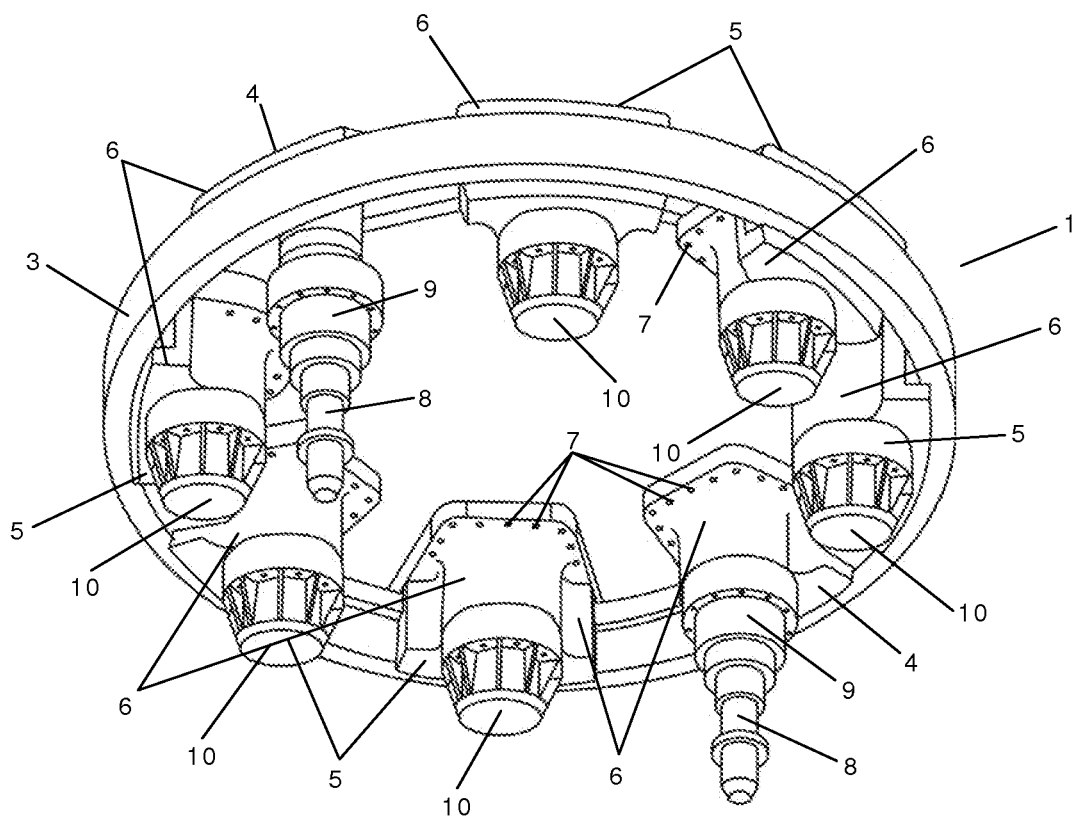
FIG. 2 is a perspective view of the yawing system of FIG. 1.

FIG. 2 is a perspective view of the yawing system 1 of FIG. 1. As described above, the yawing system 1 comprises a toothed ring 3. The yawing system 1 further comprises two drive modules 4 and six dummy modules 5. Each of the modules 4, 5 comprises a sub-module 6, and the sub-modules 6 of the drive modules 4 are identical to the sub-modules 6 of the dummy modules 5. The modules 4, 5 in combination form a rotating part of the yawing system 1, the rotating part being connectable to a nacelle (not shown) of a wind turbine. To this end, the modules 4, 5 may be attached by bolting the sub-modules 6 to a base frame of the nacelle, via holes 7 formed in the sub-modules 6.

The modules 4, 5 are arranged substantially equidistantly along an inner perimeter of the toothed ring 3 with the sub-modules 6 clamped around the toothed ring 3. Sliding surfaces (not visible) are provided on the clamping parts of the sub-modules 6 and on the toothed ring 3 in order to allow the modules 4, 5 and the toothed ring 3 to slide relatively to each other.

The drive modules 4 are each provided with a yaw motor 8 and a yaw gear 9 for the yaw motor 8. The yaw motor 8 is adapted to drive a pinion gear (not visible) which meshes with an inner toothing (not visible) of the toothed ring 3. Thereby the yaw motors 8 are able to rotate the rotating part, i.e., the modules 4, 5, and thereby a nacelle connected thereto, relative to the toothed ring 3. The dummy modules 5 do not perform any particular function apart from forming a part of the sliding bearing of the yawing system 1, and they are provided with a dummy element 10. Since the sub-modules 6 of the drive modules 4 and the dummy modules 5 are identical, the drive modules 4 and the dummy modules 5 are distinguished from each other by means of the elements positioned therein, i.e., the modules 4, 5 have been configured by positioning elements with a desired function in a standard sub-module 6. This allows the possibility of reconfiguring a module 4, 5. For instance, if it is desired to replace one of the dummy modules 5 by a drive module 4, this may be done by removing the dummy element 10 from the relevant sub-module 6, and inserting a yaw motor 8, a yaw gear 9 and a pinion gear in the sub-module 6. It may even be possible to do this without removing the sub-module 6 from the yawing system 1.

The function and operation of the modules 4, 5 will be described in further detail below.

Figure 3:
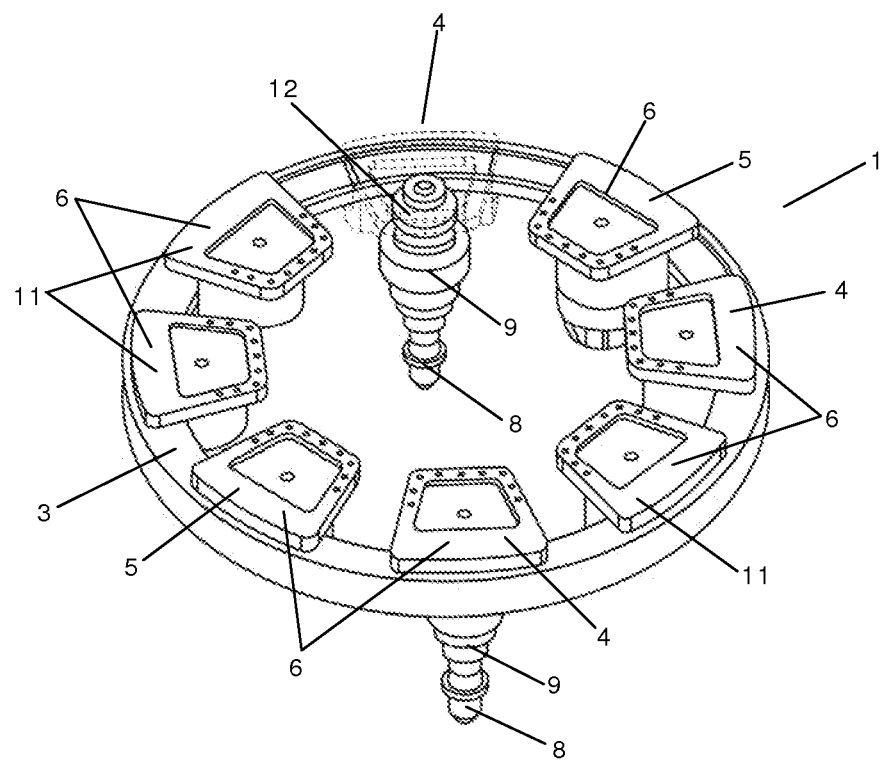
FIG. 3 is a perspective view of a yawing system similar to the yawing system of FIGS. 1 and 2, and seen from a different angle.

FIG. 3 is a perspective view of a yawing system 1 similar to the yawing system 1 of FIGS. 1 and 2. In FIG. 3 the yawing system 1 is shown from a different angle than is the case in FIGS. 1 and 2. The yawing system 1 of FIG. 3 also comprises a toothed ring 3 and a number of modules 4, 5, 11 positioned relative to the toothed ring 3 as described above. In the yawing system 1 of FIG. 3 there are two drive modules 4, two dummy modules 5 and four braking modules 11. Thus, the yawing system 1 of FIG. 3 differs from the yawing system 1 of FIGS. 1 and 2 only in the choice and position of modules 4, 5, 11. This underlines that the yawing system 1 is very flexible and highly customizable, since a yawing system 1 having desired properties can easily be designed, merely by selecting appropriate modules and positioning the modules in an appropriate manner. It should be noted that modules could be selected among even further kinds of modules.

It is clear from FIG. 3 that the sub-modules 6 of the various modules 4, 5, 11 are identical, and that the modules 4, 5, 11 differ due to the different elements mounted in the modules 4, 5, 11 as described above.

One of the drive modules 4 is shown with its sub-module 6 being transparent. This allows the pinion gear 12 described above to be seen, and it is clear that the pinion gear 12 is positioned in such a manner that it is allowed to mesh with an inner perimeter of the toothed ring 3.

Figure 4:
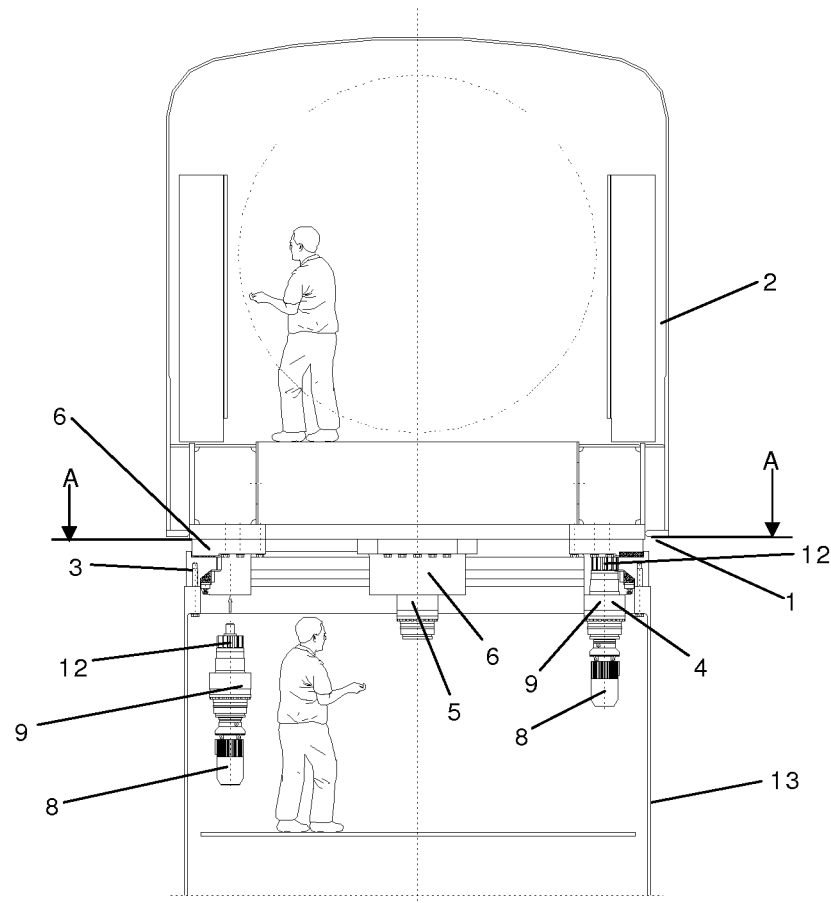
FIG. 4 is a cross sectional view of a yawing system according to an embodiment of the invention, and positioned in a wind turbine.

FIG. 4 is a cross sectional view of a yawing system 1 according to an embodiment of the invention. The yawing system 1 of FIG. 4 is positioned in a wind turbine between a nacelle 2 and a tower construction 13. A drive module 4 and a dummy module 5 are visible. Furthermore, a sub-module 6 is shown without any elements mounted therein. However, a unit comprising a yaw motor 8, a yaw gear 9 and a pinion gear 12 is shown immediately beneath this sub-module 6, thereby indicating that such a unit may be positioned in the sub-module 6, thereby configuring it to be a drive module. Alternatively, other elements may be mounted, thereby configuring the sub-module 6 as another kind of module. It is also clear from FIG. 4 that the yawing system 1, in particular the modules, is easily accessible, for example, for maintenance and/or adjustment purposes.

Figure 5:
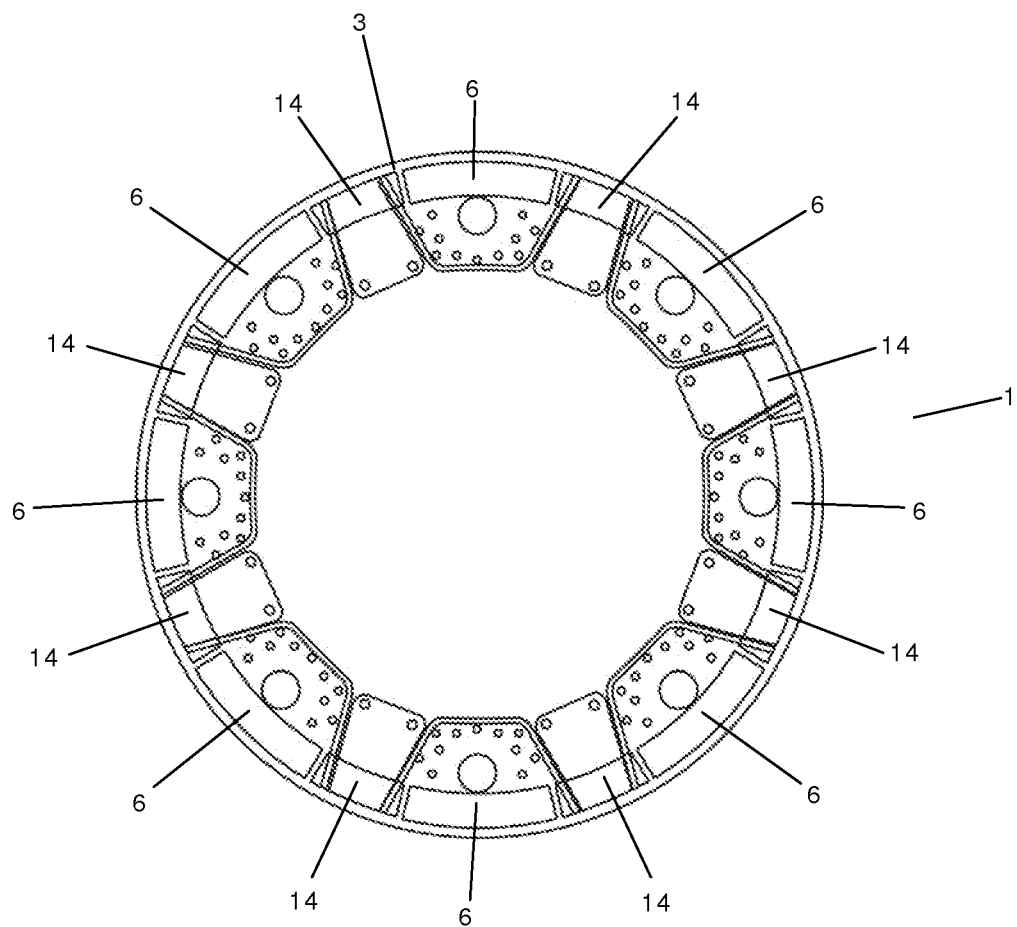
FIG. 5 is a cross sectional view of the yawing system of FIG. 4 along the line A-A shown in FIG. 4.

FIG. 5 is a cross sectional view of the yawing system 1 of FIG. 4 along the line A-A shown in FIG. 4. Only the sub-modules 6 are visible, i.e., it is not possible to see any of the elements which define the kind of module.

Between the sub-modules 6 a number of covering modules 14 are positioned in such a manner that the sub-modules 6 and the covering modules 14 in combination form a closed ring. As explained above, such a closed ring is very suitable for providing a closed lubrication system for moving parts of the yawing system 1, for example, the pinion gears 12 of the drive modules 4.

The covering modules 14 each have a size and a shape which differs from the size and shape of the sub-modules 6. Thus, the covering modules 14 have a width which decreases in a direction from the centre of the toothed ring 3 towards the outer perimeter of the toothed ring 3. This shape allows a covering module 14 to be removed from the closed ring of sub-modules 6 and covering modules 14 in a radial direction towards the centre of the toothed ring 3.

Furthermore, when two covering modules 14 positioned on either side of a sub-module 6 have been removed in this manner, it is possible to remove this sub-module 6. Thereby a sub-module 6 can be replaced without having to dismantle the entire yawing system 1.

Figure 6:
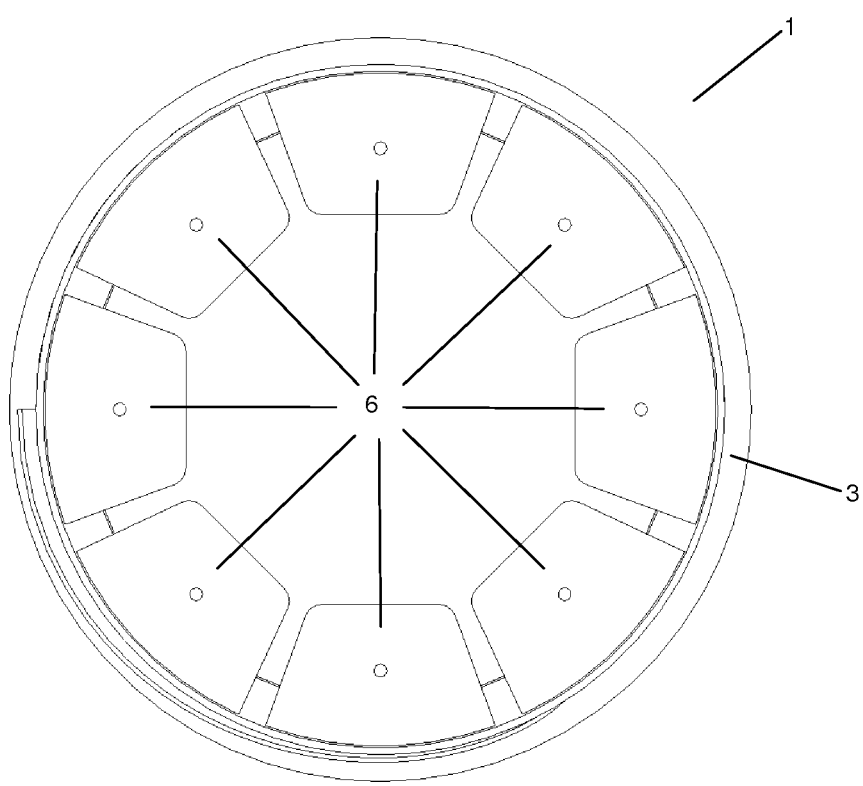
FIG. 6 is a schematic illustration of the yawing system of FIG. 4, seen from above.

FIG. 6 is a schematic illustration of the yawing system 1 of FIG. 4, seen from above. The yawing system 1 of FIG. 6 differs from the yawing system 1 shown in FIG. 5 in that no covering modules are present.

Figure 7:
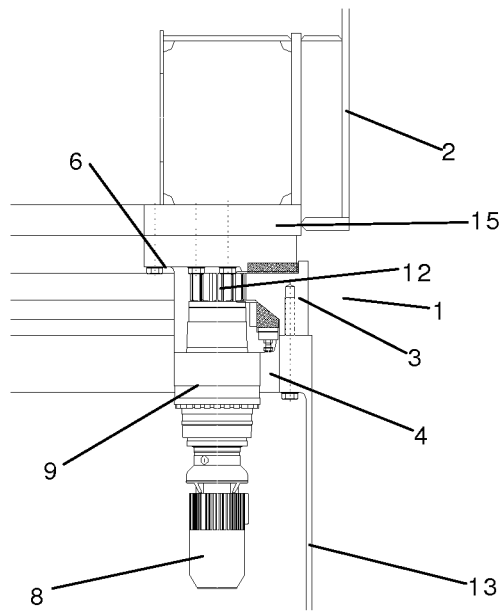
FIG. 7 is a side view of a drive module positioned in a yawing system which is positioned in a wind turbine.

FIG. 7 is a side view of a drive module 4 positioned in a yawing system 1 which is positioned in a wind turbine. As described above, the drive module 4 comprises a yaw motor 8, a yaw gear 9 for the yaw motor 8 and a pinion gear 12 positioned adjacent a toothed inner part of the toothed ring 3. It is clear from FIG. 7 that the sub-module 6 of the drive module 4 is connected to a base frame 15 of a nacelle 2, and that the toothed ring 3 is connected directly to a tower construction 13.

Figure 8:
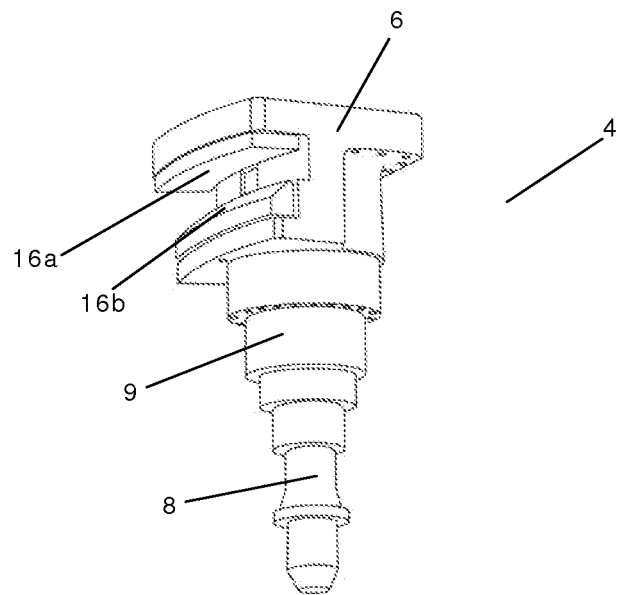
FIG. 8 is a perspective view of a drive module.

FIG. 8 is a perspective view of a drive module 4. In FIG. 8 the yaw motor 8, the yaw gear 9 for the yaw motor 8 and the sub-module 6 are clearly visible. Furthermore, the sub-module 6 shown in FIG. 8 is provided with sliding surfaces 16*a* and 16*b* adapted to slide along a sliding surface of a toothed ring when the drive module 4 is clamped onto the toothed ring as shown in any of FIGS. 1-3. The sliding surfaces 16*a*, 16*b* are shown as forming part of separate members, and these members could be made from a different material than the remaining part of the sub-module 6, for example, a material with good sliding properties.

Figure 9:
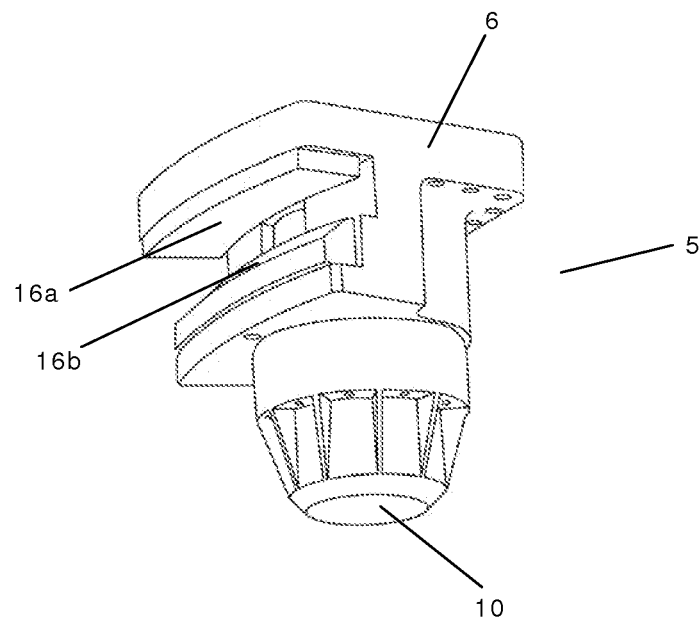
FIG. 9 is a perspective view of a dummy module.

FIG. 9 is a perspective view of a dummy module 5. The dummy element 10 and the sub-module 6 are visible. The sub-module 6 is provided with sliding surfaces 16*a* and 16*b* as described above with reference to FIG. 8. It should be noted that the sub-modules 6 shown in FIG. 8 and FIG. 9 are identical.

Figure 10:
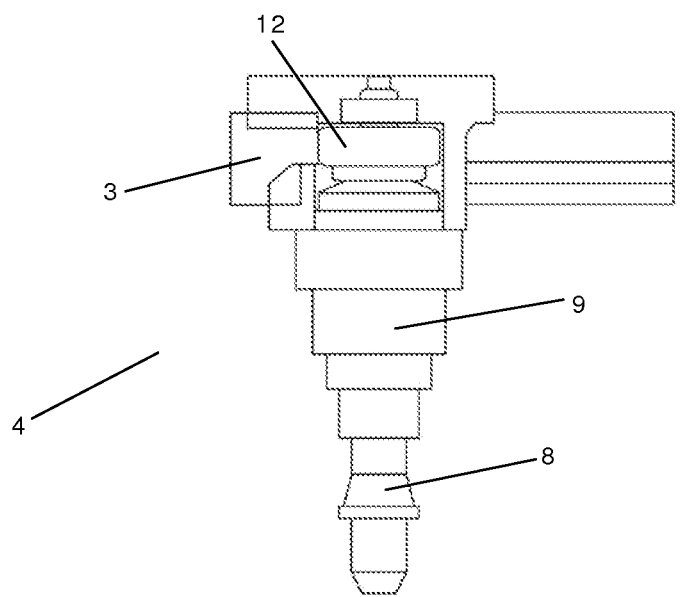
FIG. 10 is a view of a drive module.

FIG. 10 is a view of a drive module 4. The drive module 4 is mounted in a yawing system adjacent a toothed ring 3. The drive module 4 comprises a yaw motor 8, a yaw gear 9 for the yaw motor 8 and a pinion gear 12 adapted to mesh with the toothed ring 3. Some parts, including the toothed ring 3, are shown in a cross sectional view, while the yaw motor 8, the yaw gear 9 and the pinion gear 12 are shown in a side view. The drive module 4 preferably operates in the following manner. When it is desired to rotate the rotating part of the yawing system relative to the stationary part, a signal is supplied to the yaw motor 8.

In response to this signal, the yaw motor 8 starts operating, thereby causing the pinion gear 12 to rotate with a gearing relative to the rotation of the yaw motor 8. The gearing is determined by the yaw gear 9. Due to the mesh between the pinion gear 12 and the toothed ring 3, this will cause the drive module 4, and thereby the rotating part of the yawing system, to rotate relatively to the toothed ring 3, and thereby relative to the stationary part of the yawing system.

Figure 11:
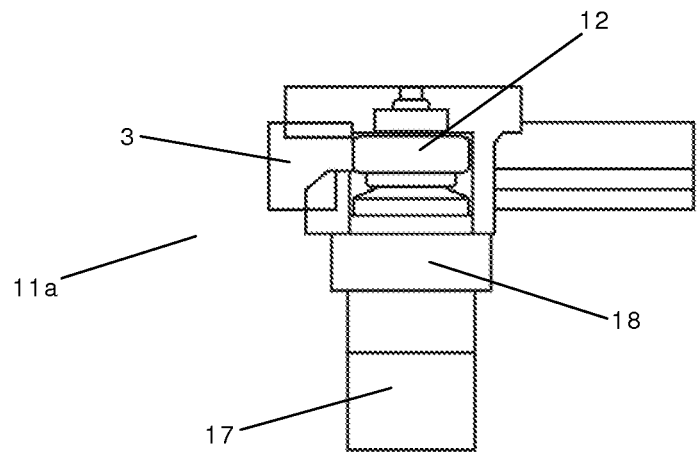
FIG. 11 is a view of a passive braking module.

FIG. 11 is a view of a passive braking module 11*a*. The braking module 11*a* comprises a friction brake 17 and a gear 18. The friction brake 17 may advantageously comprise biasing means, such as one or more springs, biasing the braking module 11*a* towards a friction plate positioned on the toothed ring 3. The braking module 11*a* is further provided with a pinion gear 12 adapted to mesh with the toothed ring 3. Some parts, including the toothed ring 3, are shown in a cross sectional view, while the friction brake 17, the gear 18 and the pinion gear 12 are shown in a side view. The braking module 11*a* preferably operates in the following manner. When one or more drive modules causes the rotating part of the yawing system to rotate relative to the stationary part as described above, this will cause the pinion gear 12 of the braking module 11*a* to rotate about its rotational axis, due to the mesh between the pinion gear 12 and the toothed ring 3. The friction brake 17 will counteract this rotation, thereby applying a braking moment against the yawing movement. The gear 18 enhances this effect.

Figure 12:
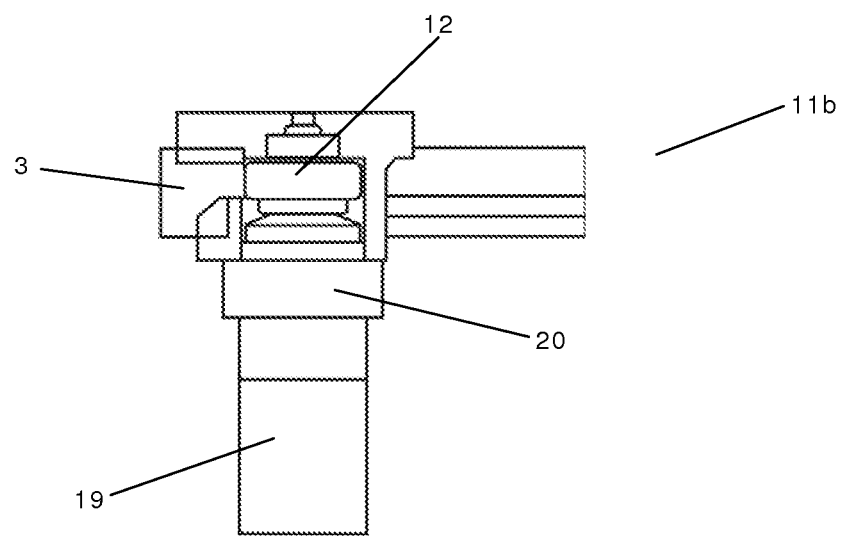
FIG. 12 is a view of an active braking module.

FIG. 12 is a view of an active braking module 11*b*. The braking module 11*b* comprises an electromagnetic brake 19, a gear 20 and a pinion gear 12. Some parts, including the toothed ring 3, are shown in a cross sectional view, while the electromagnetic brake 19, the gear 20 and the pinion gear 12 are shown in a side view. The braking module 11*b* preferably operates as the passive braking module 11*a* of FIG. 11. However, in this case the braking moment is adjustable in the sense that the braking module 11*b* may be 'on' or 'off'. It may advantageously be chosen that the braking module 11*b* is 'on' during normal turbine operation and 'off' during yawing, thereby making it easier for the drive modules to operate the yawing system.

Figure 13:
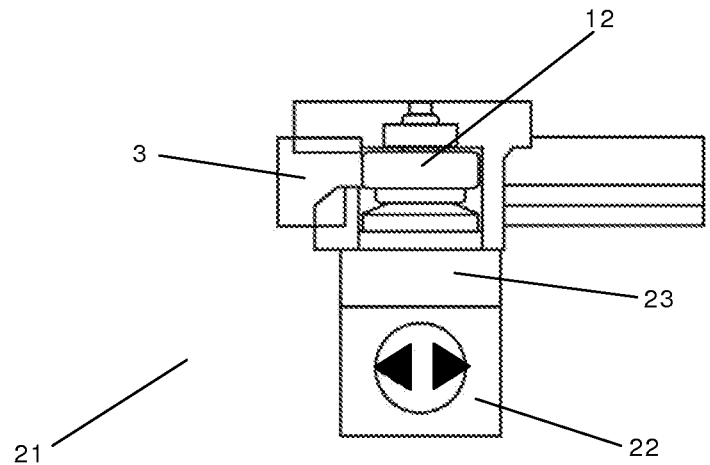
FIG. 13 is a view of a hydraulic damping module.

FIG. 13 is a view of a hydraulic damping module 21. The damping module 21 comprises a hydraulic damping element 22, a gear 23 and a pinion gear 12 adapted to mesh with the toothed ring 3. The hydraulic damping element 22 may advantageously comprise a hydraulic pump. Some parts, including the toothed ring 3, are shown in a cross sectional view, while the hydraulic damping element 22, the gear 23 and the pinion gear 12 are shown in a side view. The damping module 21 preferably operates in the following manner. When one or more drive modules causes the rotating part of the yawing system to rotate relative to the stationary part as described above, this will cause the pinion gear 12 of the hydraulic damping module 21 to rotate about its rotational axis, due to the mesh between the pinion gear 12 and the toothed ring 3. This rotation of the pinion gear 12 will cause the hydraulic pump to start displacing hydraulic fluid, thereby providing a damping function for the yawing movement. This has already been described above.

Figure 14:
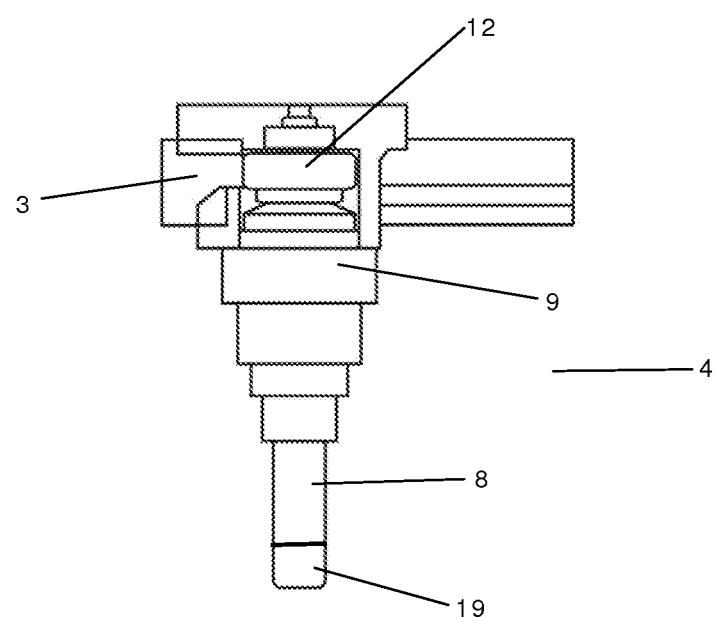
FIG. 14 is a view of a drive module with a braking element mounted thereon.

FIG. 14 is a view of a drive module 4 with a braking element 19 mounted thereon. The braking element 19 may preferably be an electromagnetic brake. Some parts, including the toothed ring 3, are shown in a cross sectional view, while the yaw motor 8, the yaw gear 9, the braking element 19 and the pinion gear 12 are shown in a side view. The drive module 4 preferably operates as described above with reference to FIG. 10. However, the drive module 4 of FIG. 14 is further adapted to apply a braking moment to the yawing system. This may advantageously be obtained in the manner described above with reference to FIG. 12. Accordingly, the module shown in FIG. 14 performs two functions, i.e., driving the yawing system and providing a braking function.

The invention claimed is:

1. The yawing system for a wind turbine comprising a tower construction and a nacelle, the yawing system comprising:
   a stationary part being connectable to or forming part of a tower construction of a wind turbine;
   a rotating part being connectable to a nacelle of a wind turbine, the rotating part being arranged adjacent to the stationary part in such a manner that the rotating part is allowed to rotate relative to the stationary part via a gear connection between the stationary part and the rotating part;
   wherein the rotating part comprises a plurality of modules, each comprising a basis part, the basis parts being at least substantially identical in size and shape, each module being configurable to perform various functions, the configuration of a module determining which function said module is able to perform, at least one of said modules being configured as a drive module adapted to drive a rotational movement of the rotational part relative to the stationary part, via the gear connection;
   wherein a configured module is replaceable with another configured module to perform a different function or is reconfigurable to perform a different function without altering the main design of the rotating part, and
   wherein a configured module belongs to a category of modules reflecting the function of the configured module, the categories of modules being selected from the group consisting of: drive modules, active braking modules, passive braking modules, damping modules, structural modules and covering modules.

2. The yawing system according to claim 1, wherein each configured module belongs to one of at least two different categories of modules.

3. The yawing system according to claim 1, wherein the stationary part and the rotating part in combination form a separate yawing unit, said yawing unit being adapted to define an interface between a tower construction and a nacelle of a wind turbine having the yawing system positioned therein.

4. The yawing system according to claim 1, wherein each drive module comprises a drive motor, and wherein the rotating part defines a connection plane where the rotating part is adapted to be connected to a nacelle of a wind turbine, and wherein each drive motor is arranged in such a manner that the basis part associated with each drive module is positioned between the drive motor and the connection plane.

5. The yawing system according to claim 4, wherein the drive motor is a geared motor.

6. The yawing system according to claim 4, wherein the drive motor is electrically driven.

7. The yawing system according to claim 4, wherein the drive motor is hydraulically driven.

8. The yawing system according to claim 1, wherein the gear connection comprises a toothed ring arranged on or forming part of the stationary part.

9. The yawing system according to claim 8, wherein the toothed ring is internally toothed.

10. The yawing system according to claim 9, wherein the rotating part further comprises at least one covering module, and wherein the basis parts and the at least one covering module in combination form an at least substantially closed ring.

11. The yawing system according to claim 1, wherein the modules are provided with sliding surfaces in order to allow the modules to slide relative to the stationary part.

12. The yawing system according to claim 1, wherein each drive module comprises a pinion gear adapted to mesh with a gear part of the stationary part, and wherein the pinion gear of each drive module is supported against radial deflections via two supporting points, said supporting points being arranged on the basis part on opposing sides of the pinion gear along a direction defined by an axis of rotation for the pinion gear.

13. The yawing system according to claim 1, wherein at least one of the modules is radially movable relative to the stationary part.

14. The yawing system according to claim 1, wherein at least one of the modules is a braking module, the at least one braking module comprising an adjusting device configured to adjust a braking force applied by said braking module, said adjusting device being operable while said braking module is positioned in the yawing system.

15. The yawing system according to claim 1, wherein the modules are configurable by positioning one or more function defining elements in the corresponding basis part.

16. A wind turbine, comprising;

a tower construction;

a nacelle; and a yawing system, said yawing system being arranged between the tower construction and the nacelle, and comprising a stationary part being connectable to or forming part of a tower construction of a wind turbine; and a rotating part being connectable to a nacelle of a wind turbine, the rotating part being arranged adjacent to the stationary part in such a manner that the rotating part is allowed to rotate relative to the stationary part via a gear connection between the stationary part and the rotating part;

wherein the rotating part comprises a plurality of modules, each comprising a basis part, the basis parts being at least substantially identical in size and shape, each module being configurable to perform various functions, the configuration of a module determining which function said module is able to perform, at least one of said modules being configured as a drive module adapted to drive a rotational movement of the rotational part relative to the stationary part, via the gear connection, wherein a configured module is replaceable with another configured module to perform a different function or is reconfigurable to perform a different function without altering the main design of the rotating part, and wherein a configured module belongs to a category of modules reflecting the function of the configured module, the categories of modules being selected from the group consisting of: drive modules, active braking modules, passive braking modules, damping modules, structural modules and covering modules.

* * * * *